(12) United States Patent
Shige et al.

(10) Patent No.: US 8,210,750 B2
(45) Date of Patent: Jul. 3, 2012

(54) VEHICLE BEARING ASSEMBLY

(75) Inventors: Yoshifumi Shige, Kashiba (JP); Tatsuya Fujitani, Aichi-ken (JP)

(73) Assignee: JTEKT Corporation, Osaka-Shi, Osaka (JP)

( * ) Notice: Subject to any disclaimer, the term of this patent is extended or adjusted under 35 U.S.C. 154(b) by 1007 days.

(21) Appl. No.: 12/219,943

(22) Filed: Jul. 30, 2008

(65) Prior Publication Data

US 2009/0041399 A1    Feb. 12, 2009

(30) Foreign Application Priority Data

Aug. 1, 2007    (JP) .................................. 2007-200612

(51) Int. Cl.
*F16C 41/04* (2006.01)
*F16C 32/04* (2006.01)
*G01P 3/48* (2006.01)

(52) U.S. Cl. .................................. 384/448; 324/207.25

(58) Field of Classification Search .................. 384/446, 384/448, 449, 537; 324/173–174, 207.21, 324/207, 22, 207.25, 226
See application file for complete search history.

(56) References Cited

U.S. PATENT DOCUMENTS

| | | | |
|---|---|---|---|
| 5,640,087 A * | 6/1997 | Alff | .............................. 324/173 |
| 6,127,819 A | 10/2000 | Ouchi | |
| 6,232,772 B1 * | 5/2001 | Liatard et al. | ............ 324/207.25 |
| 6,254,276 B1 * | 7/2001 | Ouchi et al. | ................... 384/448 |
| 6,375,359 B1 * | 4/2002 | Miyazaki | ...................... 384/448 |
| 6,844,719 B2 * | 1/2005 | Tsuge et al. | ................... 324/174 |
| 7,374,344 B2 * | 5/2008 | Shigeoka et al. | ............. 384/448 |
| 7,878,059 B2 * | 2/2011 | Campbell | ........................ 73/488 |
| 2006/0228062 A1 | 10/2006 | Nagata et al. | |

FOREIGN PATENT DOCUMENTS

| | | |
|---|---|---|
| DE | 198 47 863 A1 | 5/1999 |
| EP | 1 237 004 A2 | 9/2002 |
| EP | 1 693 676 A2 | 8/2006 |
| JP | 2004-052833 | 2/2004 |
| JP | 3636201 B1 * | 4/2005 |
| JP | 2005106238 A * | 4/2005 |
| JP | 2005127355 A * | 5/2005 |

OTHER PUBLICATIONS

European Search Report dated Feb. 26, 2009.

* cited by examiner

*Primary Examiner* — Marcus Charles
(74) *Attorney, Agent, or Firm* — McGinn IP Law Group, PLLC

(57) ABSTRACT

A vehicle bearing assembly includes a sensor mounting hole provided in a cover of an outer ring member; a rotational speed sensor that is inserted in the sensor mounting hole; and an O-ring disposed between an inner peripheral surface of the sensor mounting hole and an outer peripheral surface of the rotational speed sensor. A chamfered portion is formed along the edge of the opening of the sensor mounting hole on the outer face of the cover. A chamfer edge portion as the boundary between the inner peripheral surface of the sensor mounting hole and the chamfered portion has a depth in the axial direction.

6 Claims, 5 Drawing Sheets

VEHICLE BEARING ASSEMBLY

CROSS REFERENCE TO RELATED APPLICATIONS

The disclosure of Japanese Patent Application No. 2007-200612 filed on Aug. 1, 2007 including the specification, drawings and abstract is incorporated herein by reference in its entirety.

BACKGROUND OF THE INVENTION

1. Field of the Invention

The present invention relates to a vehicle bearing assembly to which a wheel is attached.

2. Description of the Related Art

To detect the speed of a vehicle or actuate an antilock brake system (ABS), a rotational speed detection sensor is attached to a vehicle bearing assembly to which a wheel is attached and the rotational speed of the axle (wheel) is detected. The vehicle bearing assembly has: an inner ring member, which is a rotary member that constitutes a flanged axle; an outer ring member, which is a stationary member fixed to the vehicle body via a steering knuckle; two rows of rolling elements disposed between the inner ring member and the outer ring member; cages that retain the rolling elements, and so on. A detection object, such as a pulser ring, is attached to the inner ring member that rotates together with the wheel, and a rotational speed sensor, which detects the rotational speed of the detection object, is attached to the outer ring member as a non-rotating side. The rotational speed sensor is inserted into a sensor mounting hole extending through a cover provided at the end of the outer ring member. The cover is placed over the inboard side of the outer ring member. An O-ring is provided between an outer peripheral surface of the rotational speed sensor and an inner peripheral surface of the sensor mounting hole. The O-ring is fitted in a circumferential groove formed in the outer peripheral surface of the rotational speed sensor, and seals the gap between the rotational speed sensor and the sensor mounting hole. The O-ring prevents the entrance of contaminants into the inside of the roll bearing through the gap between the rotational speed sensor and the sensor mounting hole (see Japanese Patent Application Publication No. 2004-52833)).

To provide an O-ring between the rotational speed sensor and the sensor mounting hole, the rotational speed sensor is inserted into the sensor mounting hole with the O-ring fitted in the circumferential groove in the outer peripheral surface of the rotational speed sensor. Because the outer diameter of the O-ring before the O-ring is compressively deformed is greater than the inner diameter of the sensor mounting hole, the rotational speed sensor cannot be inserted without compressively deforming the O-ring, and a specific force (a force in the axial direction required to insert the rotational speed sensor into the sensor mounting hole, which may be hereinafter referred also as "insertion force") is necessary to insert the rotational speed sensor. When a large insertion force is required, the efficiency in assembling the vehicle bearing assembly decreases.

When the O-ring abuts against the edge of the opening on the sensor insertion side, the surface pressure on the O-ring increases and the insertion force tends to be excessively large. Thus, it is considered desirable to provide a uniform (conically tapered) chamfered portion 61 along the entire edge of the opening of the sensor mounting hole 60 on the outer face of the cover (sensor insertion side) as shown in FIG. 5 to reduce the required insertion force.

It has, however, been found that the required insertion force cannot be reduced sufficiently even if the chamfered portion 61 is provided as described above. That is, it has been found that the insertion force becomes excessively large when the O-ring is moved through the chamfer edge portion 63 (see FIG. 5) as the boundary between the inner peripheral surface 62 of the sensor mounting hole 60 and the chamfered portion 61 in that case. Because the O-ring undergoes especially significant compression deformation when the O-ring is moved through the chamfer edge portion 63, at which the diameter of the chamfered portion 61 is smallest, and because the surface pressure on the O-ring may become excessively large because of the edge shape of the chamfer edge portion 63, a large insertion force is required.

SUMMARY OF THE INVENTION

The present invention provides a vehicle bearing assembly which is efficiently assembled because a rotational speed sensor with an O-ring thereon may be inserted into a sensor mounting hole of the vehicle bearing assembly with a relatively small force.

A vehicle bearing assembly according to a first aspect of the present invention includes: a rotary member that has wheel attachment portion on the outboard side thereof; a stationary member fixed to the vehicle body; a rolling element that is rotatably disposed between the rotary member and the stationary member; a detection object that rotates together with the rotary member; a cover, attached to the inboard side of the stationary member, that includes a sensor mounting hole; a rotational speed sensor that is inserted in the sensor mounting hole; and an O-ring disposed between an inner peripheral surface of the sensor mounting hole and an outer peripheral surface of the rotational speed sensor. A chamfered portion is formed along the edge of the opening of the sensor mounting hole on the outer face of the cover, and a chamfer edge portion, as the boundary between the inner peripheral surface of the sensor mounting hole and the chamfered portion, has a depth in the axial direction of the sensor mounting hole.

According to the first aspect, the chamfer edge portion has a depth in the axial direction. Thus, when the rotational speed sensor is inserted, the entire circumference of the O-ring does not abut against the chamfer edge portion at the same time; some parts of the circumference of the O-ring pass through (over) the chamfer edge portion first and are followed by the other parts in sequence. Therefore, the insertion force required to move the O-ring through the chamfer edge portion is reduced.

In the first aspect, the chamfered portion may have an oval radial cross-section. In this case, the insertion force may be further reduced because the chamfer edge portion having a depth in axial direction can extend continuously and smoothly and because the chamfered portion can be defined by a smoothly curved surface.

In the first aspect, the rotational speed sensor may have a sensor flange portion and the sensor flange portion may be secured to the outer surface of the cover by a bolt and a nut. Also, the head of the bolt may be embedded in the cover and a bolt shank that protrudes from the outer surface of the cover and extends through the sensor flange portion. The nut is then threaded on the end of the bolt protruding from the sensor flange portion. In this case, because the bolt head is surrounded by resin and the cover has no bolt insertion hole extending therethrough, there is no need for an O-ring or seal member to seal the bolt insertion hole and the cover can provide a good seal.

According to the first aspect, the force required to insert the rotational speed sensor with an O-ring thereon into the sensor mounting hole may be reduced, and the efficiency of the insertion process is improved.

A cover as a second aspect of the present invention used for a vehicle bearing assembly. The cover has a member that has a sensor mounting hole for receiving a sensor. A chamfered portion is formed along the edge of the opening of the sensor mounting hole on the outer face of the cover, and a chamfer edge portion, as the boundary between the inner peripheral surface of the sensor mounting hole and the chamfered portion, has a depth in the axial direction of the sensor mounting hole.

A third aspect of the present invention is directed to a cover, including a sensor, that is used for a vehicle bearing assembly. The cover also has a member that has a sensor mounting hole for receiving the sensor. A chamfered portion is formed along the edge of the opening of the sensor mounting hole on the outer face of the cover, and a chamfer edge portion, as the boundary between the inner peripheral surface of the sensor mounting hole and the chamfered portion, has a depth in the axial direction of the sensor mounting hole.

According to the second and third aspects, the chamfer edge portion has a depth in the axial direction. Thus, when the rotational speed sensor is inserted, the entire circumference of the sensor does not abut against the chamfer edge portion at the same time; some parts of the circumference of the sensor pass through (over) the chamfer edge portion first and are followed by the other parts in sequence. Therefore, the insertion force required to move the sensor through the chamfer edge portion is reduced.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF THE EMBODIMENTS

Figure 1:
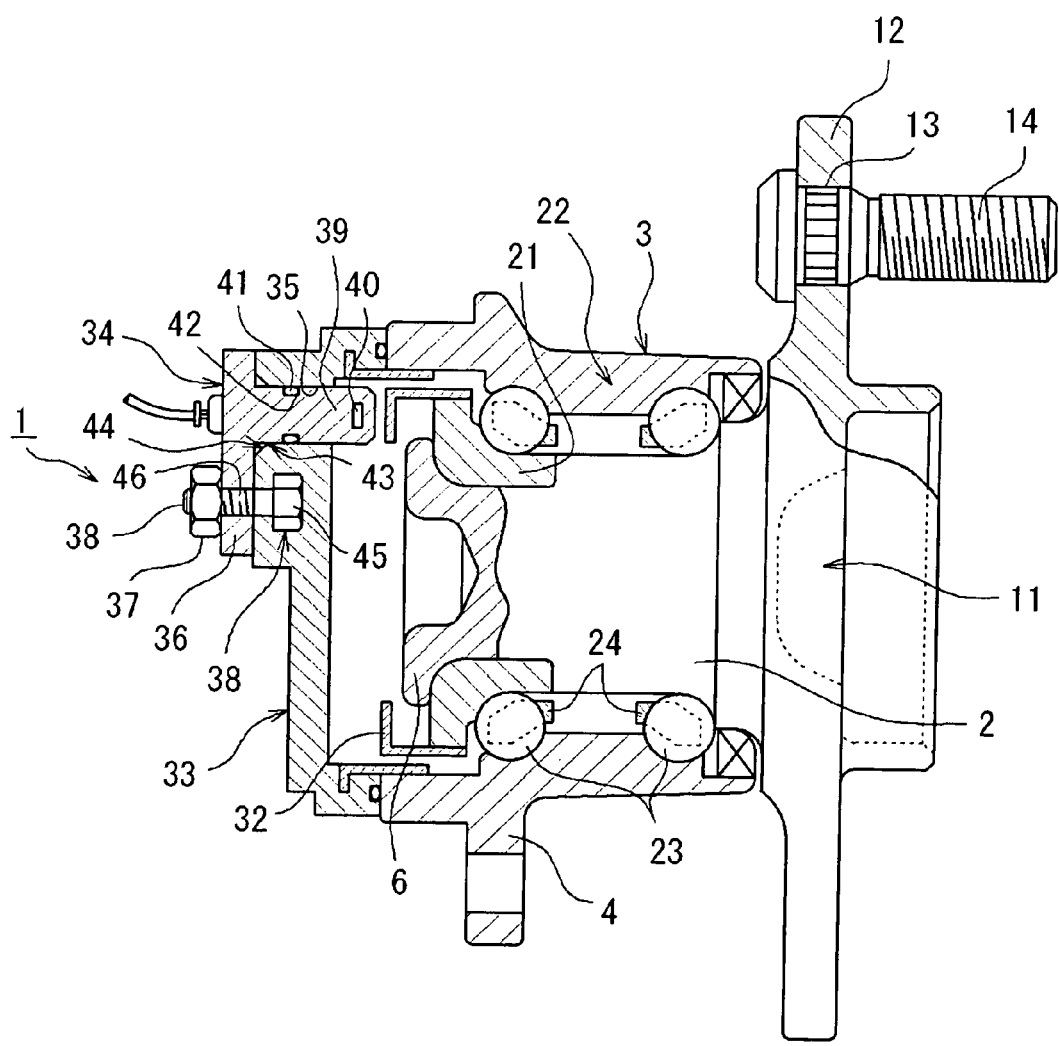
FIG. 1 is a cross-sectional view of a vehicle bearing assembly as one embodiment of the present invention.

An embodiment of the present invention is described below with reference to the drawings. FIG. 1 is an axial cross-sectional view of a vehicle bearing assembly 1 according to one embodiment of the present invention. The vehicle bearing assembly 1 has an inner ring member 11 as a rotary member having a flange portion 12, to which a wheel is attached on the outboard side; an outer ring member 22 as a stationary member that is fixed to a vehicle body; two rows of rolling elements 23 that are rotatably disposed between the inner ring member 11 and the outer ring member 22; a sensor rotor (pulser ring) 32 that serves as a detection object which rotates together with the inner ring member 11; a cover 33 attached to cover an opening of the outer ring member 22 on the inboard side; a sensor mounting hole 35 that is formed through the cover 33; a rotational speed sensor 34 that is inserted in the sensor mounting hole 35 and faces the sensor rotor 32 with a prescribed gap therebetween; and an O-ring 41 disposed between an inner peripheral surface of the sensor mounting hole 35 and an outer peripheral surface of the rotational speed sensor 34.

The inner ring member 11 has a shaft body 2 formed integrally with the flange portion 12; and an inner ring 21 fixedly attached to the inboard side of the shaft body 2. The inner ring 21 is fixed to the shaft body 2 by a caulking portion 6 formed by plastically deforming the inboard side end of the shaft body 2 radially outward. The flange portion 12 has a plurality of through holes 13 arranged circumferentially, and a disc rotor and a wheel (not shown) are attached to the flange portion 12 by bolts 14 that extend through the through holes 13. The outer ring member 22 has a fixing flange 4 on its outer periphery by which the vehicle bearing assembly is fixed to the vehicle body (not shown). The inner ring member 11, the outer ring member 22, the two-rows of rolling elements 23 and two crown-shaped cages 24 form a double-row angular ball bearing 3.

The cover 33, attached to the inboard side of the outer ring member 22 and having a generally disc shape, is a molded product of a synthetic resin such as PBT, and prevents contaminants from entering the inside of the vehicle bearing assembly 1 to protect the inside of the bearing. The O-ring 41, disposed between an inner peripheral surface of the sensor mounting hole 35 formed axially through the cover 33 and an outer surface of the rotational speed sensor 34, also prevents contaminants from entering the inside of the bearing.

The rotational speed sensor 34 has an insertion portion 39 having an outer peripheral surface with a diameter that is generally the same as that of the inner peripheral surface of the sensor mounting hole 35 of the cover 33; a circumferential groove 42 formed in the outer peripheral surface of the insertion portion 39; a detection portion 40 disposed at the tip of the insertion portion 39 and formed with an IC; and a sensor flange portion 36 that extends radially outward from a inboard side end of the insertion portion 39. The O-ring 41 is fitted in the circumferential groove 42. The detection portion 40 of the rotational speed sensor 34 faces the sensor rotor 32 with a prescribed gap therebetween, and detects the rotation of the sensor rotor 32 (that is, the rotation of the shaft body 2). The rotational speed sensor may be any type of sensor such as a magnetic sensor, which detects changes in the magnetic permeability due to the rotation of the sensor rotor, semiconductor sensor or photoelectric sensor.

Figure 4:
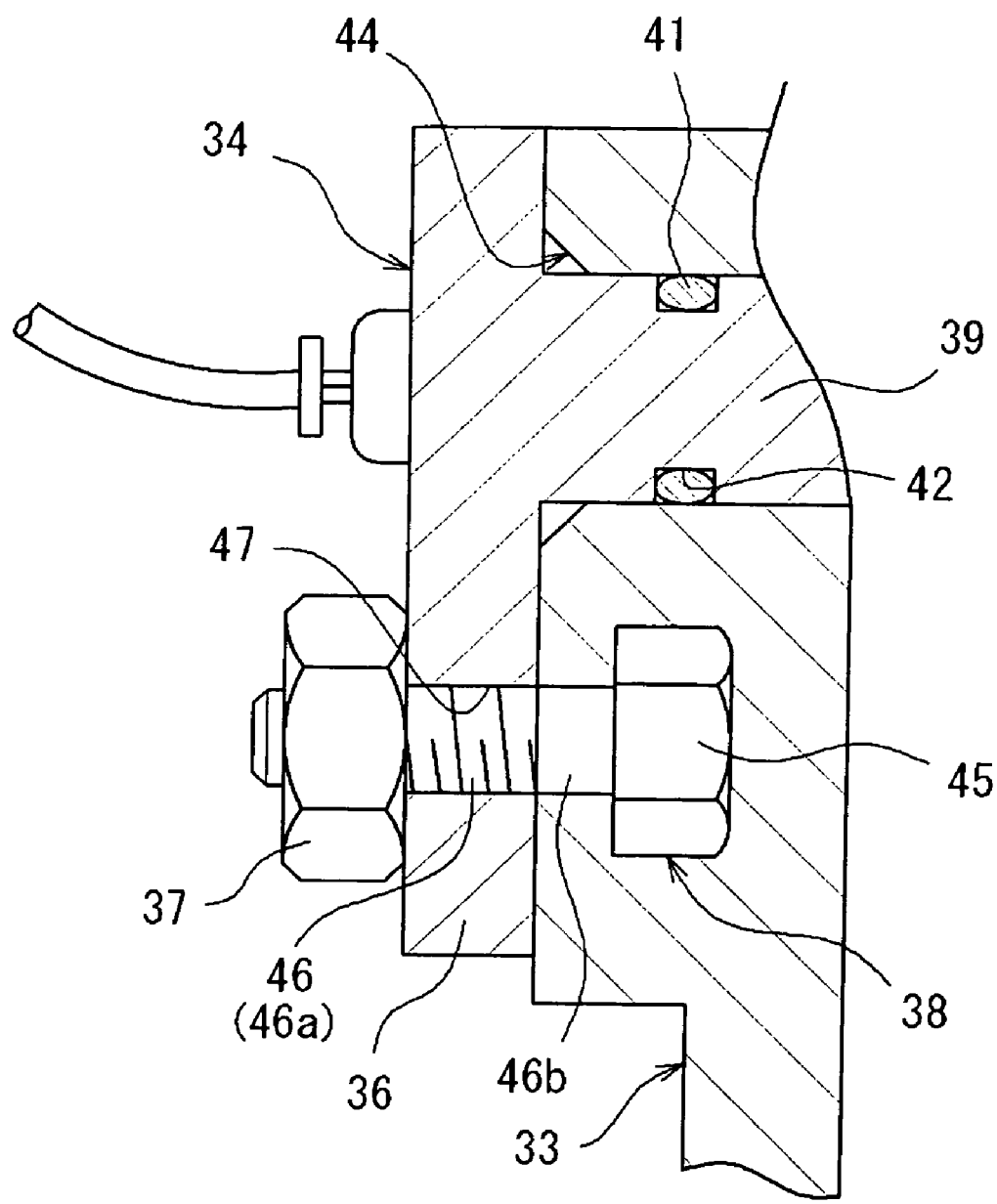
FIG. 4 is an enlarged cross-sectional view of the vicinity of a sensor flange portion of a rotational speed sensor.

FIG. 4 is an enlarged view of the vicinity of the sensor flange portion 36 shown in FIG. 1. The sensor flange portion 36 of the rotational speed sensor 34 is fixed to an outer side of the cover 33 by a bolt 38 and a nut 37. The bolt 38 has a bolt head 45 embedded in the cover 33 and a bolt shank 46 that protrudes to the inboard side from the outer surface of the cover 33. The protruding bolt shank 46 is inserted through a bolt insertion hole 47 of the sensor flange portion 36 and the nut 37 is threaded on the inserted end. The cover 33 with the head 45 of the bolt 38 embedded therein is formed by injecting a resin into a mold with the bolt 38 positioned in the mold.

In this embodiment, because the bolt head 45 is surrounded by resin and the cover 33 has no bolt insertion hole extending therethrough, there is no need for an O-ring or seal member to seal the bolt insertion hole and the cover 33 provides an adequate seal. In addition, because the bolt head 45 is embedded in the cover 33, the bolt 38 never drops from the cover 33. In addition, because the bolt 38 and the nut 37 may be general-purpose products, the parts may be purchased at a low price, which contributes to cost reduction. Moreover, the bolt head 45 embedded in the cover 33 may have a hexagonal shape or may be non-circular (serrated, for example) in cross-section, the bolt 38 is restrained from rotating and does not rotate when the nut 37 is tightened. Furthermore, the bolt shank 46 is threaded only along a protruding portion 46a protruding from the cover 33 and not along a non-protruding portion 46b embedded in the cover 33. Thus, the formation of crack in the cover 33 due to the tips of the threads is minimized.

Figure 2:
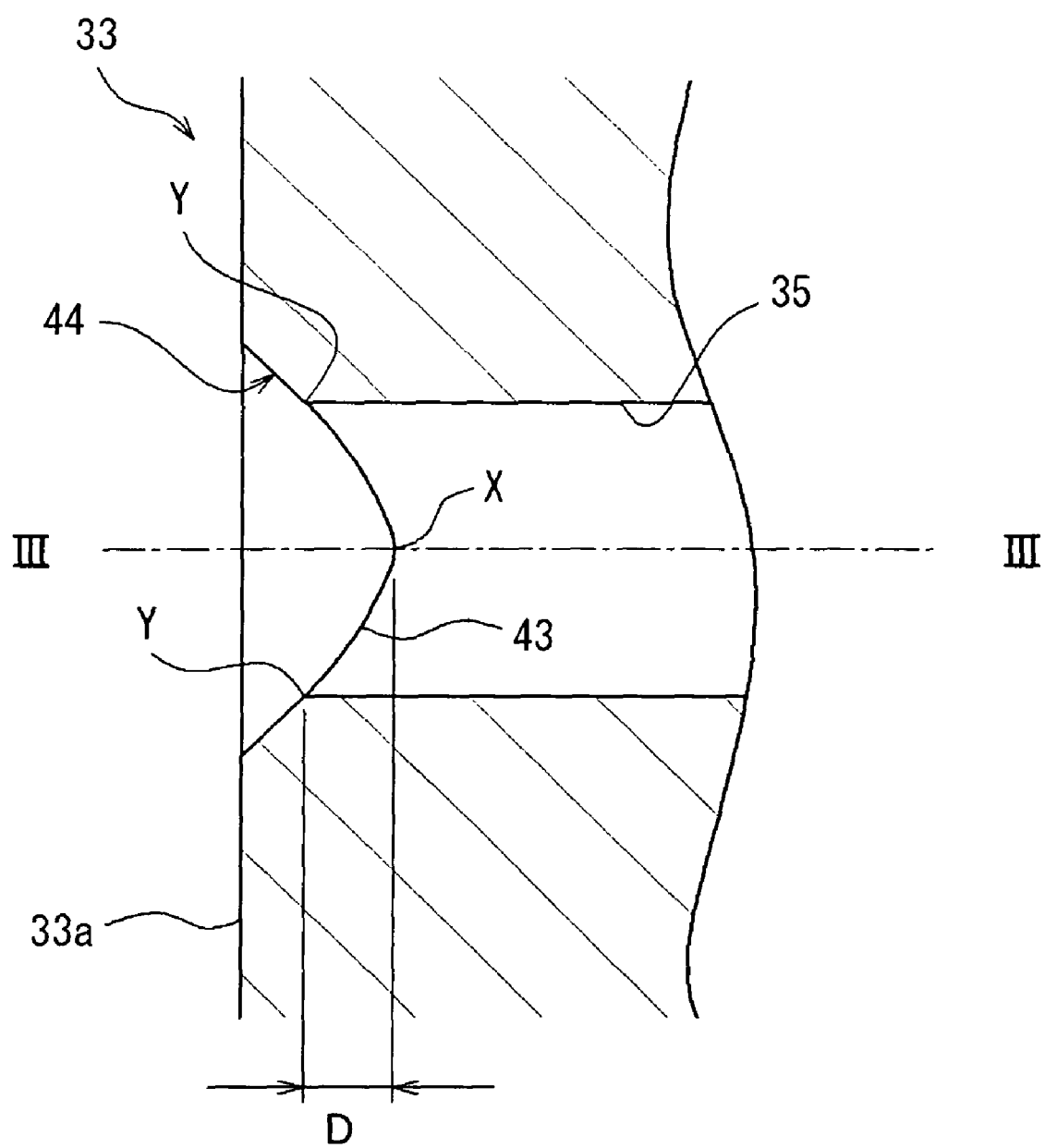
FIG. 2 is an enlarged cross-sectional view of a sensor mounting hole.
Figure 3:
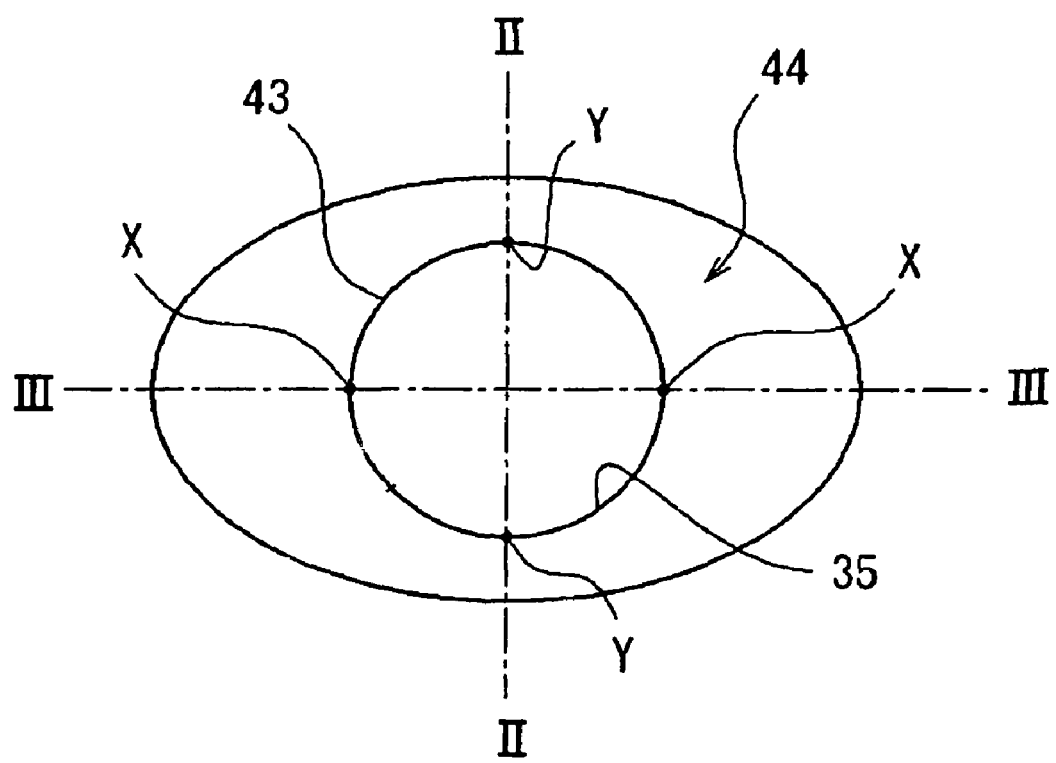
FIG. 3 is an enlarged front view of the sensor mounting hole.

FIG. 2 is an enlarged cross-sectional view of the sensor mounting hole 35, and FIG. 3 is a front view of the sensor mounting hole 35 (viewed from the inboard side). In FIG. 3, only the outlines of a chamfered portion 44 are shown in order to simplify the drawing for the sake of clarity. A chamfered portion 44 is formed along the edge of the opening of the sensor mounting hole 35 on the outer face of the cover 33a (inboard side). The rotational speed sensor 34 is inserted into the sensor mounting hole 35 from the outer face of the cover. At this time, the rotational speed sensor 34 is pushed into the sensor mounting hole 35 with the O-ring 41, fitted in the circumferential groove 42, of the rotational speed sensor 34 compressively deformed. Because the chamfered portion 44 is provided, the surface pressure on the O-ring 41 is reduced at the edge of the opening of the sensor mounting hole 35 and less force is required to insert the rotational speed sensor 34.

To further facilitate the insertion of the rotational speed sensor 34, a chamfer edge portion 43, which serves as the boundary between the inner peripheral surface (non-chamfered portion) and the chamfered portion 44 of the sensor mounting hole 35, is provided that has a depth D in the axial direction (see FIG. 2). FIG. 2 shows the cross-section taken along the line II-II of FIG. 3, and a point Y on the cross-section and a point X on the cross-section taken along a line III-III perpendicular to the line II-II (see FIG. 2 and FIG. 3) are at opposite ends of the depth D. The point X is at the outboard side end of the chamfer edge portion 43, and the point Y is at the inboard side end of the chamfer edge portion 43.

In the process of inserting the rotational speed sensor 34 into the sensor mounting hole 35, the O-ring 41 fitted on the rotational speed sensor 34 is gradually compressed and reduced in diameter when the O-ring 41 is slid on the chamfered portion 44 until it abuts on the chamfer edge portion 43 and reaches the inner peripheral surface (non-chamfered portion) of the sensor mounting hole 35 through (over) the chamfer edge portion 43. In this embodiment, the chamfer edge portion 43 has a depth in the axial direction. Thus, when the rotational speed sensor is inserted, the entire circumference of the O-ring 41 does not abut on the chamfer edge portion 43 at the same time; some parts of the circumference of the O-ring pass through the chamfer edge portion first and are followed by the other parts in sequence. Therefore, less force is required to pass the O-ring 41 through the chamfer edge portion 43 and thus the maximum insertion force needed to insert the rotational speed sensor 34 is reduced.

Figure 5:
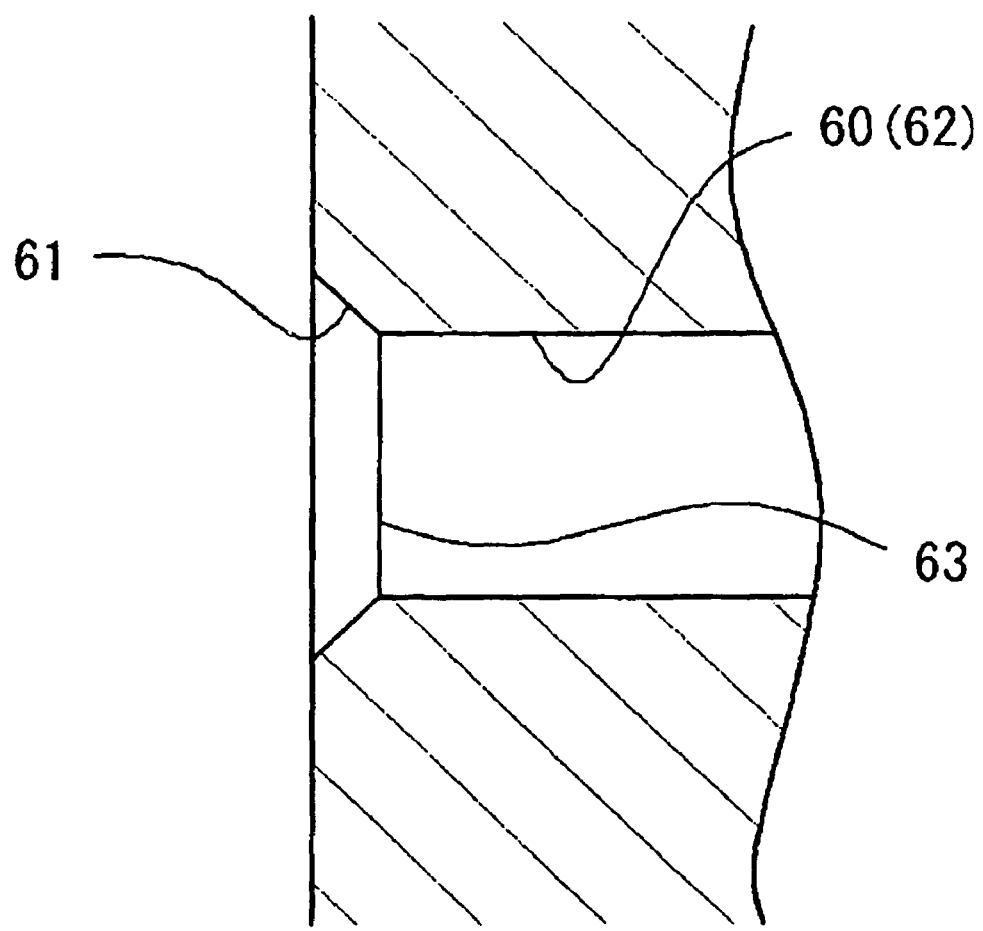
FIG. 5 is an enlarged cross-sectional view of a sensor mounting hole of a related art.

In contrast, when a uniform chamfered portion 61 is provided along the entire edge of the opening of a sensor mounting hole 60 as shown in FIG. 5, all parts of the circumference of the chamfer edge portion 63 lie in the same axial position and the chamfer edge portion 63 does not have a depth in the axial direction. Then, because the entire circumference of the O-ring passes through the chamfer edge potion at the same time, an excessively large insertion force is required when the O-ring abuts on the chamfer edge portion. In the above embodiment, the required insertion force is reduced.

As shown in FIG. 3, the chamfered portion 44 is oval in radial cross-section. Although the radial cross-section of the chamfered portion 44 is not circumferentially continuous in the range of the depth D shown in FIG. 2, the radial cross-section of the chamfered portion 44 is oval in the axial range except for the range of the depth D. When the radial cross-section of the chamfered portion 44 is oval as described above, the insertion force may be further reduced because the chamfer edge portion 43 having a depth in the axial direction extends continuously and smoothly and because the chamfered portion 44 may be defined by a smoothly curved surface. However, the radial cross-section of the chamfered portion 44 is not necessarily oval.

To provide the chamfer edge portion 43 with a depth in the axial direction, the axial position of the chamfer edge portion 43, which is defined by the chamfered portion 44, is varied circumferentially. In other words, the depth of the chamfer edge portion 43 is varied circumferentially. If the sensor mounting hole 35 has a circular cross-section as in this embodiment, the axial position of the chamfer edge portion 43 may be varied by varying the taper angle or chamfer depth of the chamfered portion 44 circumferentially, for example. Also, if the entire chamfered portion 44 is defined by a continuously and smoothly curved surface as in the above embodiment, the surface pressure which is exerted on the O-ring 41 when the O-ring 41 passes through the chamfered portion 44 is reduced, which contributes to the reduction in the required insertion force.

What is claimed is:

1. A vehicle bearing assembly, comprising:
a rotary member comprising a wheel attachment portion on an outboard side of the rotary member;
a stationary member that is fixed to a vehicle body side;
a rolling element that is rotatably disposed between the rotary member and the stationary member;
a detection object that rotates together with the rotary member;
a cover attached to an inboard side of the stationary member, the cover comprising a sensor mounting hole;
a rotational speed sensor that is inserted in the sensor mounting hole and that faces the detection object with a prescribed gap between the rotational speed sensor and the detection object; and
an O-ring disposed between an inner peripheral surface of the sensor mounting hole and an outer peripheral surface of the rotational speed sensor,
wherein a chamfered portion is formed along an edge of an opening of the sensor mounting hole on an outer face of the cover,
wherein a chamfer edge portion is formed as a boundary between the inner peripheral surface of the sensor mounting hole and the chamfered portion, the chamfer edge portion having a depth in an axial direction of the sensor mounting hole,
wherein the chamfer edge portion comprises a first portion and a second portion, and
wherein the first portion and the second portion are formed at different locations in both a circumferential direction and the axial direction of the sensor mounting hole.

2. The vehicle bearing assembly according to claim 1, wherein the chamfered portion has an oval radial cross-section.

3. The vehicle bearing assembly according to claim 2, wherein the rotational speed sensor comprises a sensor flange portion, and
wherein the assembly further comprises:
a bolt, including a bolt head and a bolt shank; and
a nut, wherein the bolt head is embedded in the cover, the bolt shank extending through the sensor flange portion, and the nut is threaded on an end of the bolt shank that protrudes from the sensor flange portion to secure the sensor flange portion to an outer surface of the cover.

4. The vehicle bearing assembly according to claim 1, wherein the rotational speed sensor comprises a sensor flange portion, and wherein the device further comprises:
 a bolt, including a bolt head and a bolt shank; and
 a nut, wherein the bolt head is embedded in the cover, the bolt shank extending through the sensor flange portion, and the nut is threaded on an end of the bolt shank that protrudes from the sensor flange portion to secure the sensor flange portion to an outer surface of the cover.

5. The vehicle bearing assembly according to claim 1, wherein a smooth and continuous edge connects the first portion and the second portion.

6. The vehicle bearing assembly according to claim 1, wherein the chamfered portion is defined by a continuously and smoothly curved surface.

* * * * *